(12) United States Patent
Williams

(10) Patent No.: US 8,127,908 B2
(45) Date of Patent: Mar. 6, 2012

(54) POLYCONE CLUTCH WITH ROLLER RAMP ACTUATOR

(75) Inventor: Randolph C. Williams, Weedsport, NY (US)

(73) Assignee: Magna Powertrain USA, Inc., Troy, MI (US)

( * ) Notice: Subject to any disclaimer, the term of this patent is extended or adjusted under 35 U.S.C. 154(b) by 601 days.

(21) Appl. No.: 12/368,481

(22) Filed: Feb. 10, 2009
(Under 37 CFR 1.47)

(65) Prior Publication Data
US 2010/0200352 A1 Aug. 12, 2010

(51) Int. Cl.
*F16D 13/04* (2006.01)
*F16D 13/26* (2006.01)

(52) U.S. Cl. ............ 192/35; 192/54.52; 192/66.21; 192/70.15; 192/93 R

(58) Field of Classification Search .......... 192/66.21, 192/70.15
See application file for complete search history.

(56) References Cited

U.S. PATENT DOCUMENTS

| 511,047 | A | * | 12/1893 | Gawron | 192/35 |
| 634,367 | A | * | 10/1899 | O'Brien | 192/70.15 |
| 3,762,519 | A | * | 10/1973 | Bentley | 192/38 |
| 2007/0029152 | A1 | * | 2/2007 | Joki | 192/38 |

* cited by examiner

*Primary Examiner* — Rodney Bonck
(74) *Attorney, Agent, or Firm* — Harness, Dickey & Pierce

(57) ABSTRACT

A torque transfer mechanism includes a friction clutch having first and second outer rings positioned on opposite sides of a center ring having conically shaped friction surfaces. The outer rings each include a plurality of conically shaped friction surfaces selectively engageable with the center ring friction surfaces. A clutch actuator includes a roller clutch having a first set of cam surfaces adapted to be fixed for rotation with a rotary input member, a slipper having a second set of cam surfaces, a plurality of rollers positioned between opposing pairs of the cam surfaces, a first wedge slide and a second wedge slide. Each wedge slide is radially outwardly moveable by radial expansion of the slipper and includes a tapered surface for driving one of the first and second outer rings into engagement with the center ring to transfer torque between the input and output members.

20 Claims, 8 Drawing Sheets

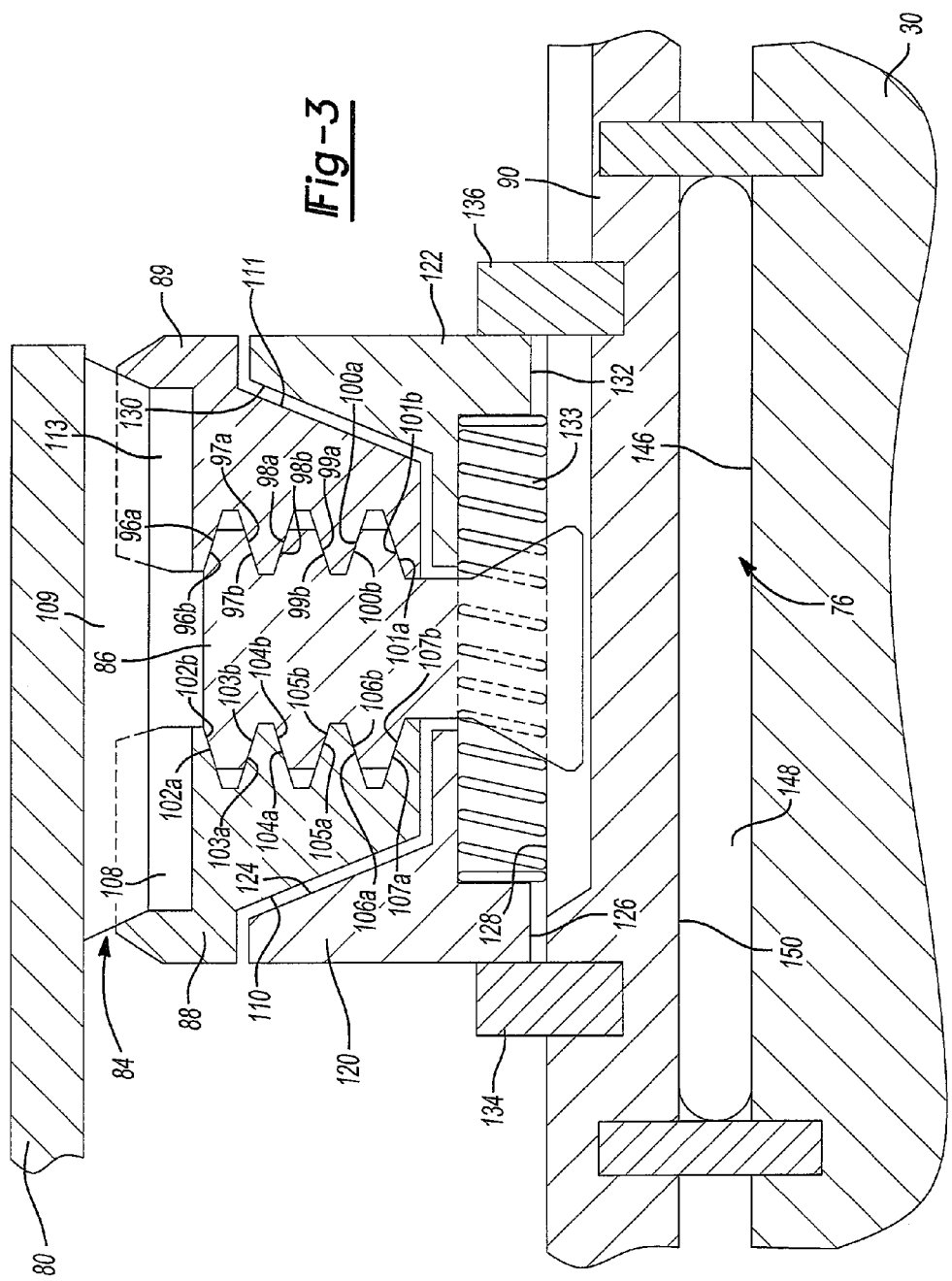

POLYCONE CLUTCH WITH ROLLER RAMP ACTUATOR

FIELD

The present disclosure relates generally to power transfer systems for controlling the distribution of drive torque between the front and rear drivelines of a four-wheel drive vehicle and/or the left and right wheels of an axle assembly. More particularly, the present disclosure is directed to a power transmission device having a torque transfer mechanism equipped with a roller clutch actuator operable for controlling actuation of a multi-cone friction clutch assembly.

BACKGROUND

A variety of power transfer systems have been developed for transferring drive torque to one or more vehicle wheels. In many vehicles, a power transmission device is operably installed between a primary and a secondary driveline. Such power transmission devices are typically equipped with a torque transfer mechanism that is operable for selectively and/or automatically transferring drive torque from the primary driveline to the secondary driveline to establish a four-wheel drive mode of operation.

A modern trend in four-wheel drive motor vehicles is to equip the power transmission device with a transfer clutch and an electronically-controlled traction control system. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the multi-plate clutch assembly. The clutch actuator may include a power-operated device that is actuated in response to electric control signals sent from an electronic control unit (ECU). Variable control of the electric control signal is frequently based on changes in the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission devices have been developed which utilize an electrically-controlled clutch actuator for regulating the amount of drive torque transferred through the multi-plate clutch assembly to the secondary driveline as a function of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size and weight of the friction clutch components and the electrical power and actuation time requirements for the clutch actuator that are needed to provide the large clutch engagement loads may make such a system cost prohibitive in some motor vehicle applications. In an effort to address these concerns, new technologies are being considered for use in power-operated clutch actuator applications.

SUMMARY

A power transmission device includes a rotary input member adapted to receive drive torque from a power source, a rotary output member adapted to provide drive torque to an output device, and a torque transfer mechanism operably disposed between the rotary input and output members. The torque transfer mechanism includes a transfer clutch operably disposed between the input and output members and a clutch actuator for controlling actuation of the transfer clutch. The transfer clutch includes a first clutch ring having conically-shaped friction surfaces and which is rotatable with one of the input and output members. The transfer clutch also includes a second clutch ring which is rotatable with the other of the input and output members and which has conically-shaped friction surfaces arranged to selectively engage the conical friction surfaces of the first clutch ring. The clutch actuator includes a roller clutch and an actuation mechanism for shifting the roller clutch between first and second operating modes. When operating in its first operating mode, the roller clutch permits movement of the second clutch ring relative to the first clutch ring which results in engagement between corresponding conical friction surfaces and the transfer of drive torque from the rotary input member to the rotary output member. In contrast, the roller clutch is operable in its second operating mode to prevent movement of the second clutch ring relative to the first clutch ring which maintains the conical friction surfaces in a disengaged condition so as to prevent the transfer of drive torque from the rotary input member to the rotary output member.

In accordance with one arrangement, the roller clutch of the present invention includes a first cam, a second cam and rollers operably disposed in cam surfaces defined between the first and second cams. The first cam is fixed to, or formed integrally with, the rotary input member while the second cam surrounds the first cam and is rotatable with the first clutch ring. The second cam is formed as part of a radially expandable slipper ring. With the roller clutch in its first operating mode, radial expansion of the slipper ring causes movement of the second clutch ring into frictional engagement with the first clutch ring. In contrast, operation of the roller clutch in its second operating mode prevents radial expansion of the slipper ring which, in turn, prevents movement of the second clutch ring into frictional engagement with the first clutch ring. The roller clutch further includes a slide member disposed between the slipper ring and the second clutch ring and which is operable to convert radial movement of the slipper ring into axial movement of the second clutch ring relative to the first clutch ring.

In accordance with a related arrangement, the transfer clutch further includes a third clutch ring disposed opposite to the second clutch ring and which is fixed for rotation with the rotary output member. The third clutch ring has conically-shaped friction surfaces arranged to be selectively engageable with conical friction surfaces on the first clutch ring when the roller clutch is shifted into its first operating mode. In addition, a first slide member is disposed between the slipper ring and the second clutch ring and a second slide member is disposed between the slipper ring and the third clutch ring. A return spring engages the first and second slide members and functions to normally bias the slide members to a position disengaged from the corresponding second and third clutch rings.

BRIEF DESCRIPTION OF THE DRAWINGS

Further objects, features and advantages of the present disclosure will become apparent to those skilled in the art from analysis of the following written description, the appended claims, and accompanying drawings in which:

FIG. 3 is an enlarged fragmentary sectional view of a torque transfer mechanism associated with the power transmission device and which is equipped with a multi-cone clutch assembly and a clutch actuator according to the present disclosure;

DETAILED DESCRIPTION OF THE PREFERRED EMBODIMENTS

The present disclosure is directed to a torque transfer mechanism that controls the drive torque transferred between a first rotary member and a second rotary member. The torque transfer mechanism finds particular application in power transmission devices for use in motor vehicle drivelines. Thus, while the present disclosure is hereinafter described in association with particular arrangements for use in specific driveline applications, it will be understood that the arrangements shown and described are merely intended to illustrate embodiments of the present disclosure.

Figure 1:
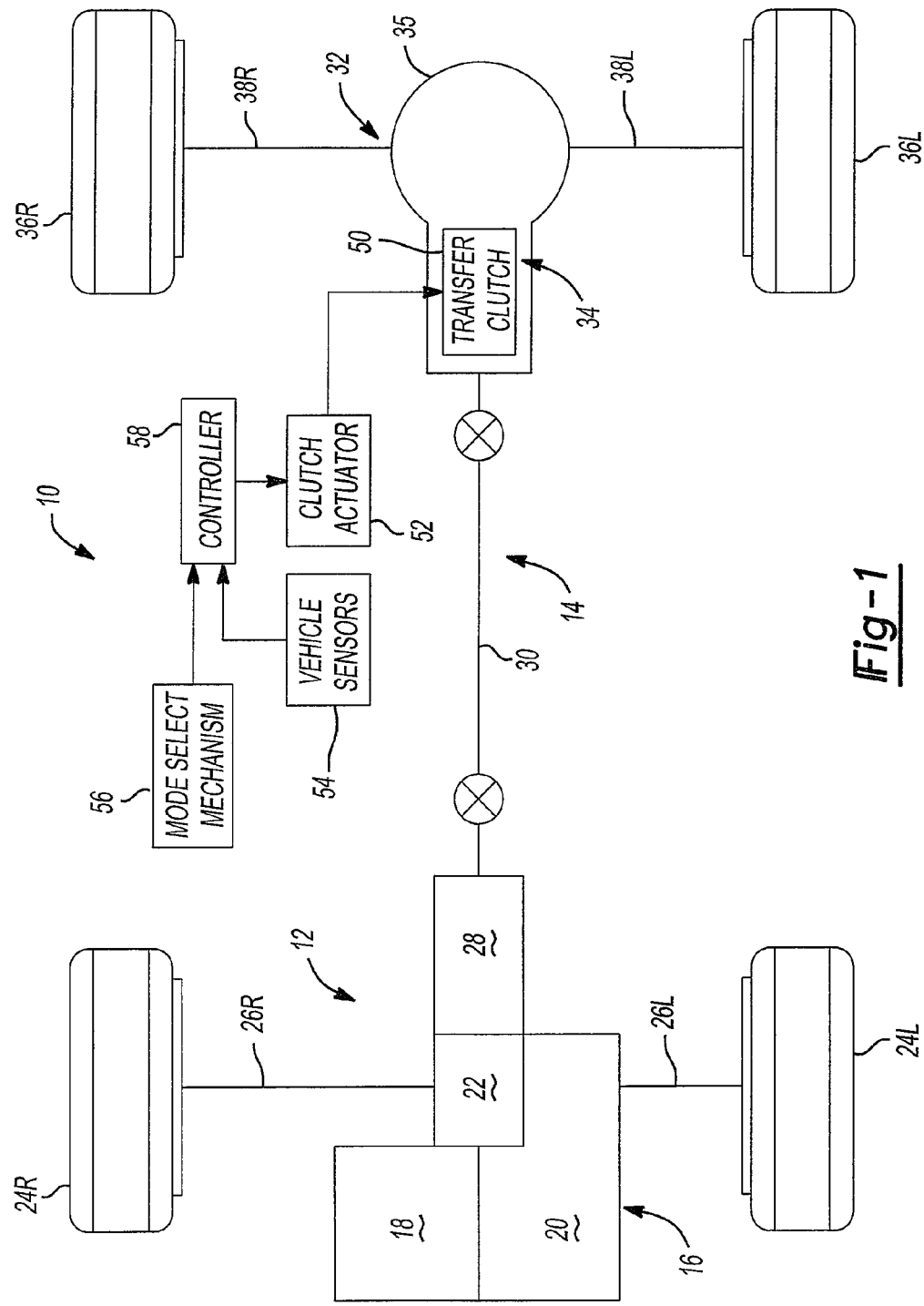
FIG. 1 is a schematic illustrating the drivetrain of an all-wheel drive motor vehicle equipped with a power transmission device of the present disclosure.

With particular reference to FIG. 1 of the drawings, a drivetrain 10 for an all-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the front driveline while secondary driveline 14 is the rear driveline. Powertrain 16 is shown to include an engine 18 and a multi-speed transmission 20. Front driveline 12 includes a front differential 22 driven by powertrain 16 for transmitting drive torque to a pair of front wheels 24L and 24R through a pair of front axleshafts 26L and 26R, respectively. Rear driveline 14 includes a power transfer unit 28 driven by powertrain 16 or differential 22, a propshaft 30 driven by power transfer unit 28, a rear axle assembly 32 and a power transmission device 34 for selectively transferring drive torque from propshaft 30 to rear axle assembly 32. Rear axle assembly 32 is shown to include a rear differential 35, a pair of rear wheels 36L and 36R and a pair of rear axleshafts 38L and 38R that interconnect rear differential 35 to corresponding rear wheels 36L and 36R.

With continued reference to the drawings, drivetrain 10 is shown to further include an electronically-controlled power transfer system for permitting a vehicle operator to select between a two-wheel drive mode and a four-wheel drive mode. In this regard, power transmission device 34 is equipped with a transfer clutch 50 that can be selectively actuated for transferring drive torque from propshaft 30 to rear axle assembly 32 for establishing the four-wheel drive mode. The power transfer system further includes a power-operated clutch actuator 52 for actuating transfer clutch 50, vehicle sensors 54 for detecting certain dynamic and operational characteristics of motor vehicle 10, a mode select mechanism 56 for permitting the vehicle operator to select one of the available drive modes, and a controller 58 for controlling actuation of clutch actuator 52 in response to input signals from vehicle sensors 54 and mode selector 56.

Power transmission device 34, hereinafter referred to as torque coupling 34, is shown schematically in FIG. 2 to be operably disposed between propshaft 30 and a pinion shaft 60. As seen, pinion shaft 60 includes a pinion gear 62 that is meshed with a hypoid ring gear 64 fixed to a differential case 66 of rear differential 35. Differential 35 is conventional in that pinions 68 driven by case 66 are arranged to drive side gears 70L and 70R which are fixed for rotation with corresponding axleshafts 38L and 38R. Torque coupling 34 is shown to generally include transfer clutch 50 and clutch actuator 52 arranged to control the transfer of drive torque from propshaft 30 to pinion shaft 60 and which together define the torque transfer mechanism of the present disclosure.

Figure 2:
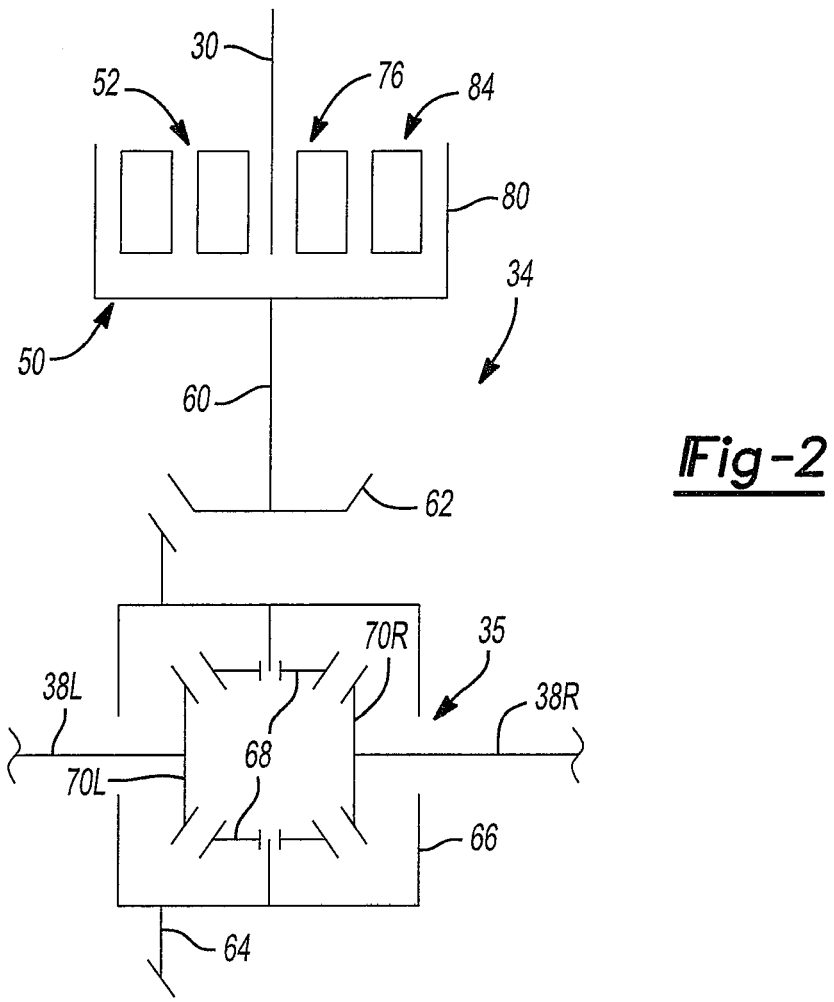
FIG. 2 is a schematic illustration of the power transmission device shown in FIG. 1 associated with a drive axle assembly.
Figure 4:
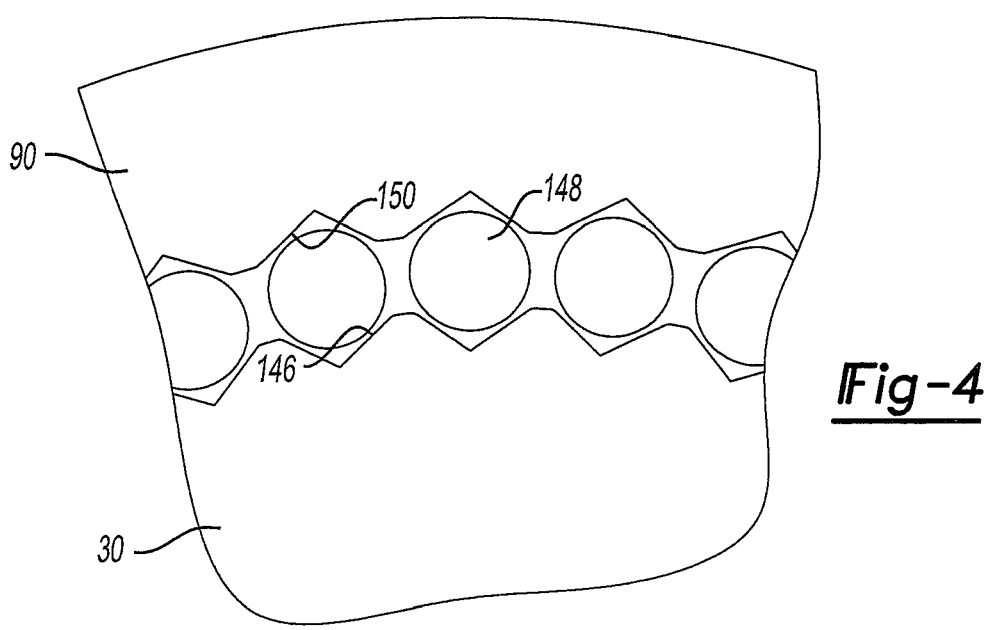
FIG. 4 is an enlarged fragmentary view of a portion of the torque transfer mechanism shown in FIG. 3.

Referring primarily to FIGS. 2-4, the components and function of torque coupling 34 will be disclosed in detail. As seen, clutch actuator 52 includes a roller clutch 76 coupled in series with transfer clutch 50. Accordingly, torque is transferred between propshaft 30 and pinion shaft 60 only when both roller clutch 76 and transfer clutch 50 transfer torque. Transfer clutch 50 includes a drum 80 or another rotatable member that is fixed for rotation with pinion shaft 60. Transfer clutch 50 also includes a multi-cone clutch assembly 84 comprised of a center clutch ring 86 and a pair of opposing outer clutch rings 88, 89. First and second outer rings 88, 89 are fixed for rotation (i.e., splined) with and axially moveable relative to drum 80. Center ring 86 is fixed for rotation (i.e., splined) with an expandable slipper ring 90 associated with roller clutch 76.

As best seen from FIG. 3, first through sixth conical friction surfaces 96a, 97a, 98a, 99a, 100a and 101a are formed on a first side of center ring 86. Each of the conical friction surfaces extends at a cone angle, preferably in the range of approximately 4-8 degrees, from an axis of rotation of center ring 86. First and second conical friction surfaces 96a, 97a are arranged to face one another and form a first generally V-shaped groove. Second and third conical friction surfaces 98a, 99a are also paired facing one another to form a second V-shaped groove. Likewise, fifth and sixth conical friction surfaces 100a, 101a face one another to define a third V-shaped groove. Each conical friction surface circumferentially extends at a different diameter than the others with the largest diameter being defined by first conical friction surface 96a and the smallest diameter being defined by sixth conical friction surface 101a.

Seventh through twelfth conical friction surfaces 102a, 103a, 104a, 105a, 106a and 107a are formed on a second side of center ring 86 opposite the first through sixth conical friction surfaces 96a-101a. Seventh and eighth conical friction surfaces 102a, 103a, ninth and tenth conical friction surfaces 104a, 105a and eleventh and twelfth 106a, 107a conical friction surfaces are arranged in pairs similar to the arrangement previously described in relation to first through sixth friction surfaces 96a-101a. In the arrangement shown in FIG. 3, the radial position, or diameter, of each conical friction surface 102a-107a corresponds to and is aligned with one of the first through sixth conical friction surfaces 96a-101a. As such, center ring 86 has a symmetrical cross section. Center ring 86 may be constructed from one of a variety of materials including brass, sintered bronze, and steel with a DLC-Si coating. Friction coatings or pads may be formed on or bonded to the conical friction surfaces. The material and the surface coating of center ring 86 may be optimized based on the maximum relative speed between adjacent clutch surfaces, the maximum apply force and the lubricant used within multi-cone clutch 84, if any.

First and second outer rings 88 and 89 are depicted as being substantially similar to one another. Accordingly, only first outer ring 88 will be described in detail. First outer ring 88 includes an external spline 108 in driving engagement with an internal spline 109 formed on drum 80. A first face 110 of first outer ring 88 is substantially planar and tapered in a radial direction. A plurality of first through sixth conical friction surfaces 96b, 97b, 98b, 99b, 100b and 101b are formed on a side of first outer ring 88 opposite face 110. First through sixth conical friction surfaces 96b-101b are sized and radially positioned to selectively drivingly engage first through sixth conical friction surfaces 96a-101a, respectively. The first and second conical friction surfaces 96b, 97b, third and fourth conical friction surfaces 98b, 99b and fifth and sixth conical friction surfaces 100b, 101b of first outer ring 88 are also arranged in pairs to form three concentric conical rings that are radially aligned with the three V-shaped grooves defined by conical friction surfaces 96a-101a on center ring 86. First outer ring 88 is axially moveable relative to center ring 86 such that mating pairs 96a-96b, 97a-97b, 98a-98b, 99a-99b, 100a-100b and 101a-101b may be selectively engaged with one another or spaced apart from one another.

As previously mentioned, second outer ring 89 is substantially similar, if not identical, to first outer ring 88. However, for clarity of description, second outer ring 89 will be described as including seventh through twelfth conical friction surfaces 102b-107b. Each of the conical friction surfaces formed on second outer ring 89 are selectively engageable in a torque transfer arrangement with corresponding seventh through twelfth conical friction surfaces 102a-107a formed on center ring 86. Second outer ring 89 includes a substantially planar and tapered face 111 positioned on an opposite side of clutch surfaces 102b-107b. Second outer ring 89 also includes an external spline 113 in engagement with internal spline 109. Thus, both first outer ring 88 and second outer ring 89 rotate in concert with drum 80 and pinion shaft 60 but are axially moveable relative to each other and center ring 86.

Multi-cone clutch assembly 84 also includes a first slide wedge 120 positioned adjacent to first outer ring 88 and a second slide wedge 122 positioned adjacent to second outer ring 89. First slide wedge 120 is shaped as a split ring and includes a tapered cam face 124 radially extending at an angle complementary to tapered face 110 of first outer ring 88. Cam face 124 is radially moveable into and out of contact with face 110. An inner diameter of first slide wedge 120 is defined by a substantially cylindrically-shaped inner surface 126. Slipper ring 90 includes a cylindrical outer surface 128 located adjacent and in close proximity to inner surface 126. As will be described in greater detail, slipper ring 90 can be radially expanded outwardly to cause cam face 124 to engage face 110 for causing axial translation of first outer ring 88 toward center ring 86.

Second slide wedge 122 is substantially similar, if not identical, to first slide wedge 120. A tapered cam surface 130 is formed on second slide wedge 122 and is selectively engageable with tapered face 111 of second outer ring 89. An inner cylindrical surface 132 of second slide wedge 122 is positioned adjacent and in close proximity to outer surface 128 of slipper ring 90. Second slide wedge 122 is also a split ring that is radially outwardly moveable upon radial outward expansion of slipper ring 90 to cause tapered cam surface 130 to engage tapered face 111. Snap rings 134 and 136 restrict first and second slide wedges 120 and 122 from axial movement away from multi-cone clutch 84. As such, radial outward movement of first slide wedge 120 and second slide wedge 122 in response to radial expansion of slipper ring 90 causes corresponding axial translation of outer rings 88, 89 toward center ring 86. In effect, slide wedges 120 and 122 function to convert radial motion of slipper ring 90 into axial movement of outer rings 88 and 89. A release spring 133 acts to bias first and second slide wedges 120, 122 against snap rings 134, 136 to assist in releasing engagement of multi-cone clutch assembly 84.

As previously indicated, clutch actuator 52 includes roller clutch 76. Roller clutch 76 includes a first cam member that is fixed to propshaft 30. Preferably, the first cam member is integrally formed with a portion of propshaft 30 and includes a plurality of first cam surfaces 146 circumferentially positioned about an outer surface of propshaft 30. A plurality of rollers 148 are circumferentially spaced apart from one another with each roller corresponding to and positioned in engagement with one of first cam surfaces 146. Slipper ring 90 functions as a second cam member and includes a corresponding set of opposing circumferential second cam surfaces 150. As noted, slipper ring 90 is constructed as a resilient split ring with its outer surface 128 defining an outer diameter less than an inner diameter defined by surfaces 126 and 132 of first and second slide wedges 120, 122 when in an unloaded or free state. Second cam surfaces 150 of slipper ring 90 are selectively positionable relative to rollers 148 and first cam surfaces 146 such that the outer diameter of slipper ring 90 is nearly at its smallest size when in the free state. At this time, roller clutch 76 is operating in an open or free-wheeling mode such that drive torque is not transferred from propshaft 30 to slipper ring 90.

Roller clutch 76 may also be placed in a locked or torque transfer mode. Slipper ring 90 can be radially expanded to cause radially outward movement of first and second slide wedges 120, 122 into frictional engagement with outer rings 88, 89. This expansion may be accomplished through relative rotation between propshaft 30 and slipper ring 90. Specifically, cam surfaces 146 and 150 may be formed to include relatively steep angles of approximately 10-15° to radially expand slipper ring 90 a desired amount. Rollers 148 move from the deepest portions of cam surfaces 146, 150 to more shallow portions thereof such that rollers 148 force slipper ring 90 to radially expand. As such, outer surface 128 of slipper ring 90 forcibly engages inner surfaces 126 and 132 of first and second slide wedges 120 and 122, respectively. As first and second slide wedges 120, 122 move radially outwardly, tapered surfaces 124, 130 respectively engage tapered faces 110, 111 of first and second outer rings 88, 89. As a result, an axially-directed application force is provided to outer rings 88, 89 for frictionally engaging center ring 86 and transferring drive torque across the multiple conical friction surfaces of multi-cone clutch assembly 84. Torque is now transferred between propshaft 30 and drum 80 for driving pinion shaft 60. It should be appreciated that radial expansion of slipper ring 90 is accomplished only when relative rotation between first cam surfaces 146 and second cam surfaces 150 occurs. Otherwise, rollers 148 maintain their position in the deepest portions of the aligned cam surfaces.

Figure 5:
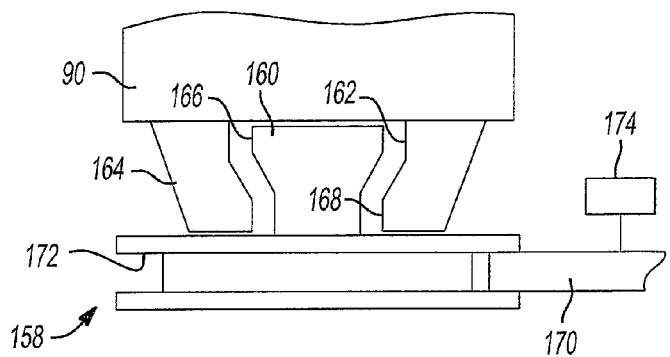
FIGS. 5 and 6 are plan views depicting the clutch actuator for the torque transfer mechanism.
Figure 6:
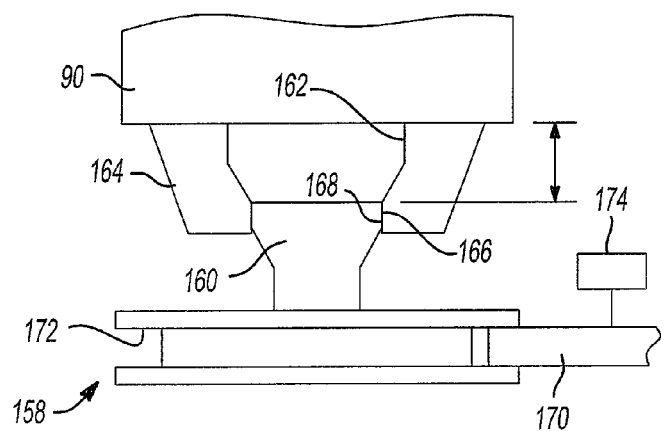
Figure 7:
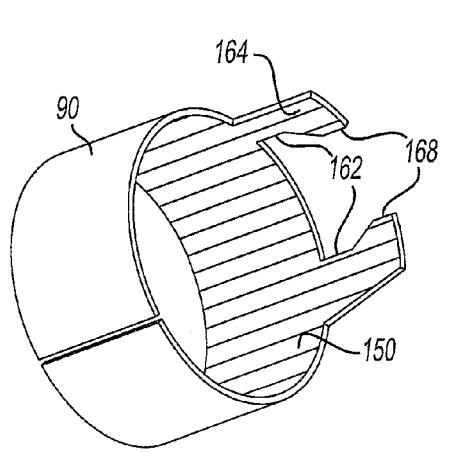
FIG. 7 is a perspective view of a slipper of the torque transfer mechanism.
Figure 8:
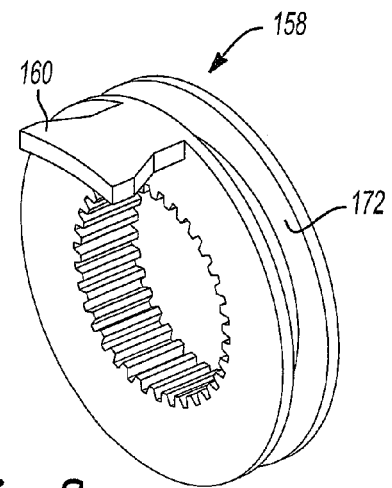
FIG. 8 is a perspective view of a sleeve of the torque transfer mechanism.

With reference to FIGS. 5 through 8, clutch actuator 52 is shown to also include an axially slidable sleeve 158 that is moveable between a first position shown in FIG. 5 and a second position shown in FIG. 6. Sleeve 158 includes an axially extending key 160 that is positioned within a notch 162 formed in a flange 164 extending from slipper ring 90. In the first position, clearance exists between key 160 and both edge surfaces of notch 162 to allow limited relative rotation between slipper ring 90 and propshaft 30, thereby allowing roller clutch 76 to automatically switch between its open and locked modes in response to relative slip between propshaft 30 and pinion shaft 60. When sleeve 158 is moved to the second position, a control surface 166 of key 160 is placed in close proximity with a narrowed portion 168 of notch 162 in flange 164. Thus, when sleeve 158 is in the second position shown in FIG. 6, relative rotation between slipper ring 90 and propshaft 30 is restricted. At this time, roller clutch 76 can not be placed in a torque transferring mode. Furthermore, slipper ring 90 can not be radially outwardly expanded to actuate multi-core clutch assembly 84.

A shift fork 170 is shown positioned within a groove 172 formed on sleeve 158 to allow relative rotation therebetween. An actuation mechanism 174 is operable to translate shift fork 170 for moving sleeve 158 between its first and second positions. Actuation mechanism 174 may include a mechanical linkage or a power-operated driver including, an electric motor, a solenoid, a hydraulic actuator or any other force outputting device. In an alternative arrangement not shown, a drag band may be positioned in selective engagement with slipper ring 90. Rotation of slipper ring 90 may be selectively restricted to allow roller clutch 76 to overrun in response to relative rotation between propshaft 30 and slipper ring 90 in a first direction and lock in response to relative rotation in the opposite direction. Examples of a roller clutch control system using the drag band are described in issued U.S. Pat. Nos. 6,878,088; 7,004,874 and 7,004,875, herein incorporated by reference. By controlling roller clutch 76 in this manner, torque coupling 34 may act in an "on demand" mode.

In operation, when mode selector 56 indicates selection of the two-wheel drive mode, controller 58 signals power-operated driver 174 to axially move sleeve 158 to its second position, thereby restricting rotation of slipper ring 90 and maintaining roller clutch 76 in its open mode. As such, drive torque is not transferred from propshaft 30 to pinion shaft 60. If mode selector 56 thereafter indicates selection of the four-wheel drive mode, power-operated driver 174 is signaled by controller 58 to move sleeve 158 to its first position. As noted, such movement of sleeve 158 allows slipper ring 90 to rotate and radially expand for locking roller clutch 76 and applying an actuation force to multi-cone clutch 84, thereby transferring drive torque from propshaft 30 to pinion shaft 60. Based on the particular embodiment shown, roller clutch 76 is operably disposed between a rotary input member, namely propshaft 30, and multi-cone clutch 84 for selectively coupling a rotary output member, namely pinion shaft 60, to the input member. However, it is contemplated that roller clutch 76 can likewise be operably arranged between pinion shaft 60 and multi-cone clutch 84 for selectively coupling pinion shaft 60 to propshaft 30.

Figure 9:
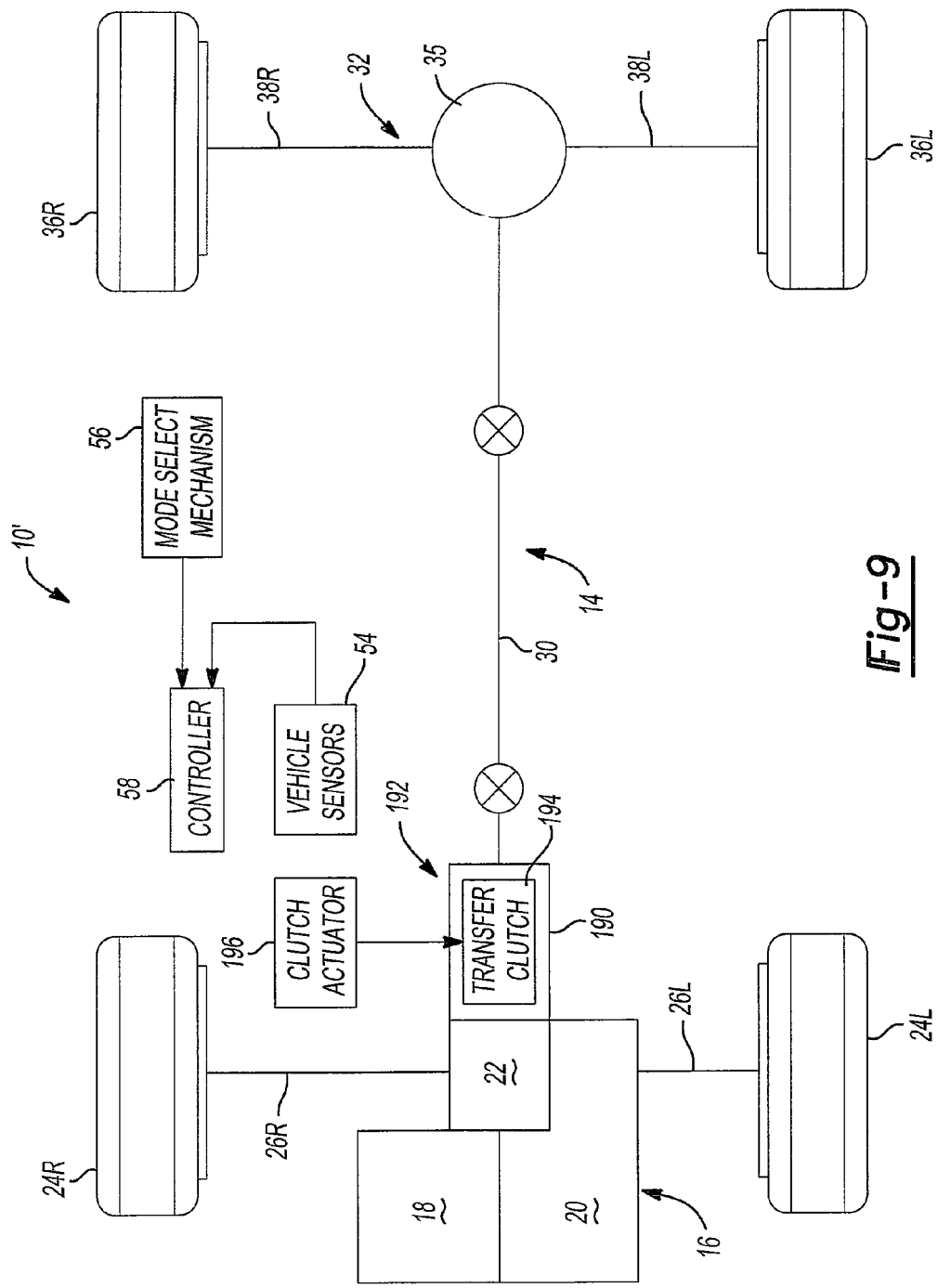
FIGS. 9 through 11 are schematic illustrations of alternative embodiments for the power transmission device of the present disclosure.

To illustrate an alternative power transmission device to which the present disclosure is applicable, FIG. 9 schematically depicts a front-wheel based four-wheel drivetrain layout 10' for a motor vehicle. In particular, engine 18 drives multi-speed transmission 20 having an integrated front differential unit 22 for driving front wheels 24L and 24R via axleshafts 26L and 26R. A power transmission device, such as power transfer unit 190, is also driven by powertrain 16 for delivering drive torque to the input member of a torque transfer coupling 192 that is operable for selectively transferring drive torque to propshaft 30 for driving the rear axle assembly. It is contemplated that torque transfer coupling 192 would include a multi-cone transfer clutch 194 and a roller clutch 196 that are generally similar in structure and function to multi-cone transfer clutch 84 and roller clutch 76 previously described herein. In this arrangement however, drum 80 could be drivingly coupled to propshaft 30 while the driven input member of torque transfer coupling 192 is associated with roller clutch 76.

Figure 10:
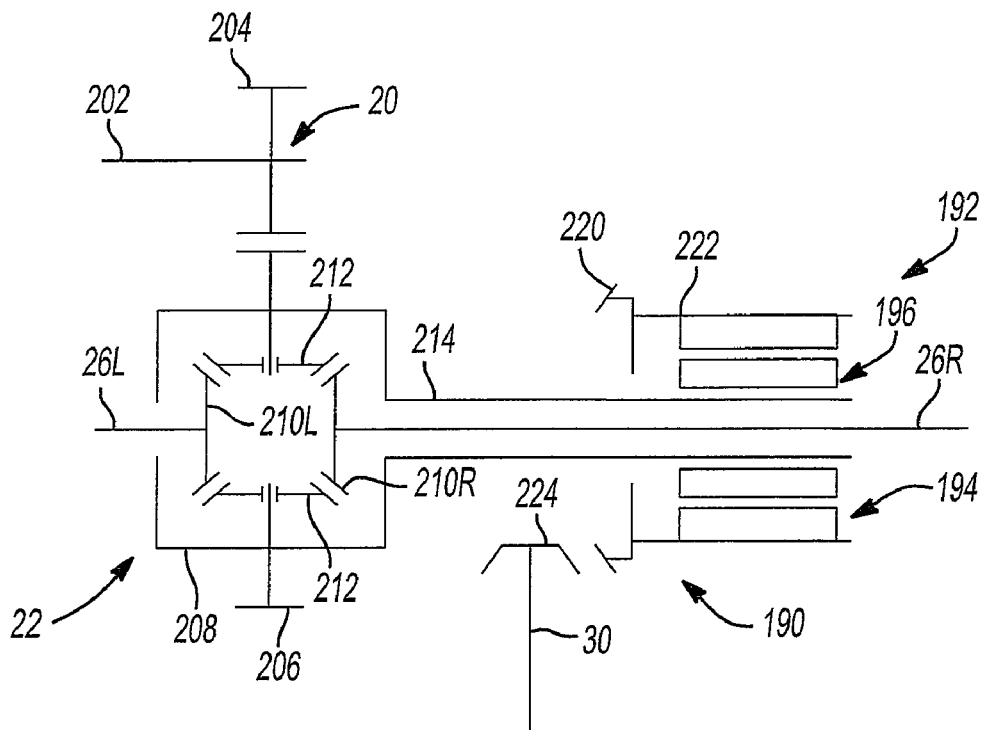

Referring to FIG. 10, power transfer unit 190 is schematically illustrated in association with an on-demand all-wheel drive system based on a front-wheel drive vehicle similar to that shown in FIG. 9. In particular, an output shaft 202 of transmission 20 is shown to drive an output gear 204 which, in turn, drives an input gear 206 fixed to a carrier 208 associated with front differential unit 22. To provide drive torque to front wheels 24L and 24R, front differential 22 further includes a pair of side gears 210L and 210R that are connected to the front wheels via corresponding axleshafts 26L and 26R. Differential unit 22 also includes pinions 212 that are rotatably supported on pinion shafts fixed to carrier 208 and which are meshed with both side gears 210L and 210R. A transfer shaft 214 is provided to transfer drive torque from carrier 208 to torque coupling 192.

Power transfer unit 190 includes a right-angled drive mechanism having a hypoid gear 220 fixed for rotation with a drum 222 of multi-cone clutch 194 and which is meshed with a pinion gear 224 fixed for rotation with propshaft 30. As seen, roller clutch 194 is disposed between transfer shaft 214 and multi-cone clutch 194. As such, drive torque can be transferred from transfer shaft 214 to propshaft 30 via actuation of roller clutch 196 in the manner previously described in connection with roller clutch 76.

Figure 11:
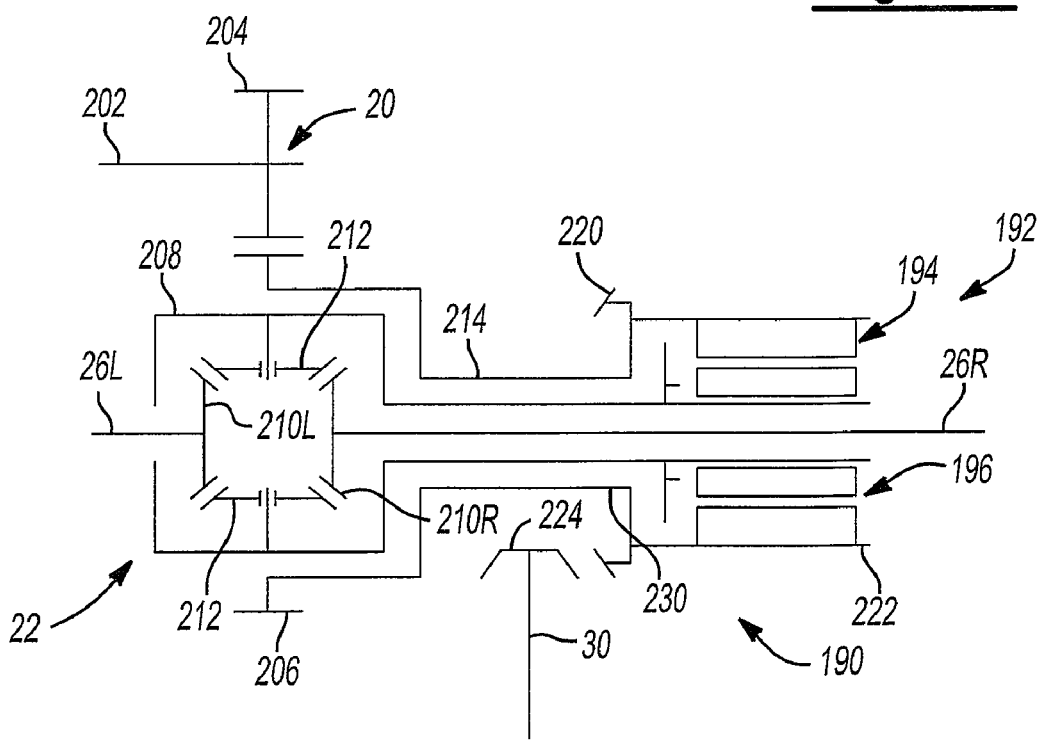

FIG. 11 illustrates a modified version of FIG. 10 wherein a four-wheel drive system is shown based on a rear-wheel drive motor vehicle that is arranged to normally deliver drive torque to rear driveline 14 while selectively transmitting drive torque to front wheels 24L and 24R through torque coupling 192. In this arrangement, drive torque is transmitted directly from transmission output shaft 202 to power transfer unit 190 via a drive shaft 230 interconnecting input gear 206 to ring gear 220. To provide drive torque to the front wheels, torque coupling 192 is shown operably disposed between drive shaft 230 and transfer shaft 214. In particular, multi-cone clutch 194 is arranged such that drum 222 is driven with ring gear 220 by drive shaft 230. As such, actuation of roller clutch 196 functions to transfer torque from drum 222 through multi-cone clutch 194 which, in turn, drives carrier 208 of front differential unit 22 via transfer shaft 214.

Figure 12:
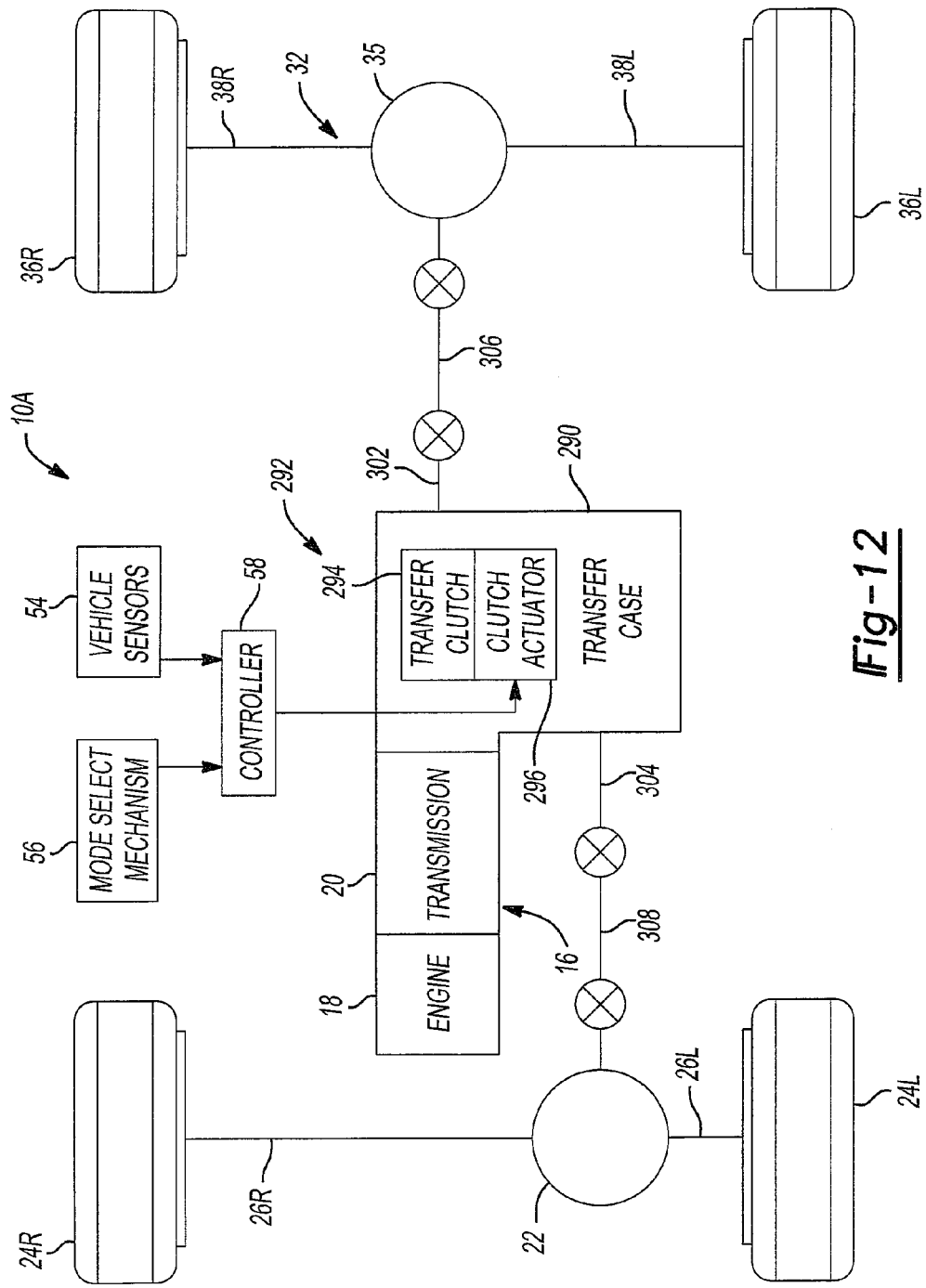
FIG. 12 illustrates the drivetrain of a four-wheel drive vehicle equipped with another version of a power transmission device of the present disclosure.

Referring now to FIG. 12, a schematic layout of a drivetrain 10A for a four-wheel drive vehicle having powertrain 16 delivering drive torque to a power transfer unit, hereinafter referred to as transfer case 290. Transfer case 290 includes a rear output shaft 302, a front output shaft 304 and a torque coupling 292 therebetween. Torque coupling 292 generally includes a multi-cone transfer clutch 294 and a roller clutch actuator 296. As seen, a rear propshaft 306 couples rear output shaft 302 to rear differential 35 while a front propshaft 308 couples front output shaft 304 to front differential 22.

Figure 13:
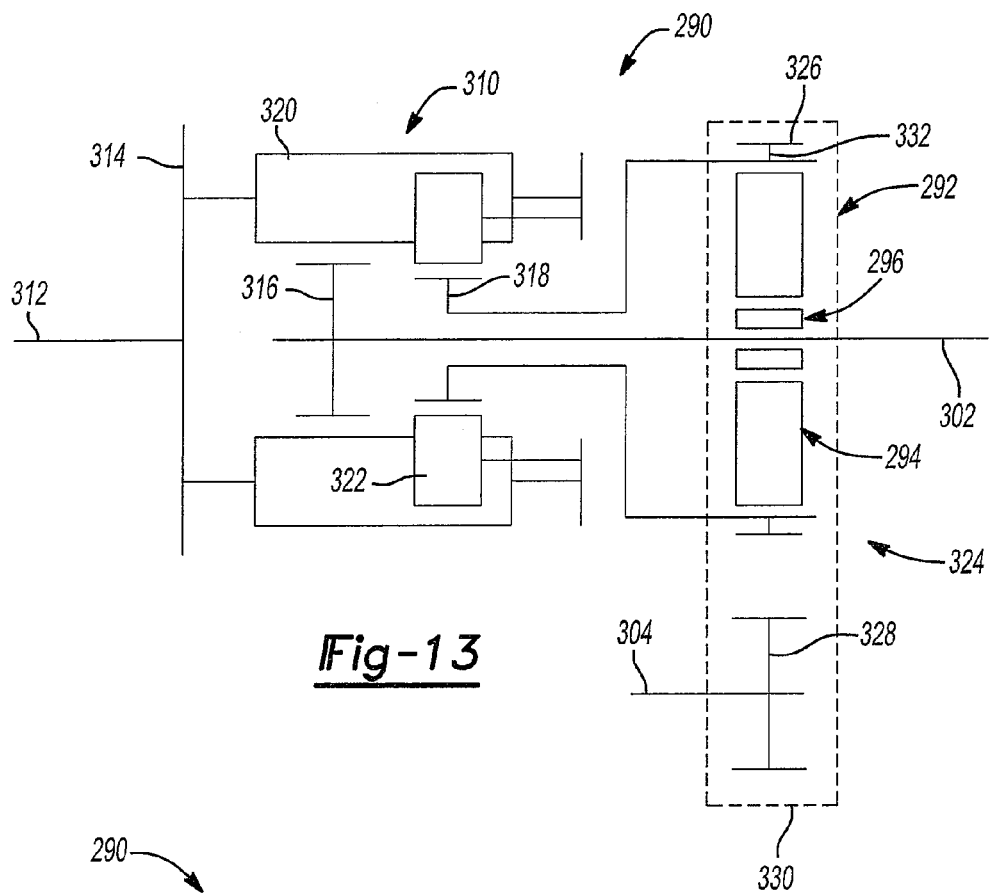
FIGS. 13 and 14 are schematic illustrations of transfer cases adapted for use with the drivetrain shown in FIG. 12.

Referring now to FIG. 13, a full-time 4WD system is shown to include transfer case 290 equipped with an interaxle differential 310 between an input shaft 312 and output shafts 302 and 304. Differential 310 includes an input defined as a planet carrier 314, a first output defined as a first sun gear 316, a second output defined as a second sun gear 318, and a gearset for permitting speed differentiation between first and second sun gears 316 and 318. The gearset includes meshed pairs of first planet gears 320 and second planet gears 322 which are rotatably supported by carrier 314. First planet gears 320 are shown to mesh with first sun gear 316 while second planet gears 322 are meshed with second sun gear 318. First sun gear 316 is fixed for rotation with rear output shaft 302 so as to transmit drive torque to the rear driveline. To transmit drive torque to the front driveline, second sun gear 318 is coupled to a transfer assembly 324 which includes a first sprocket 326 rotatably supported on rear output shaft 302, a second sprocket 328 fixed to front output shaft 304, and a power chain 330.

Figure 14:
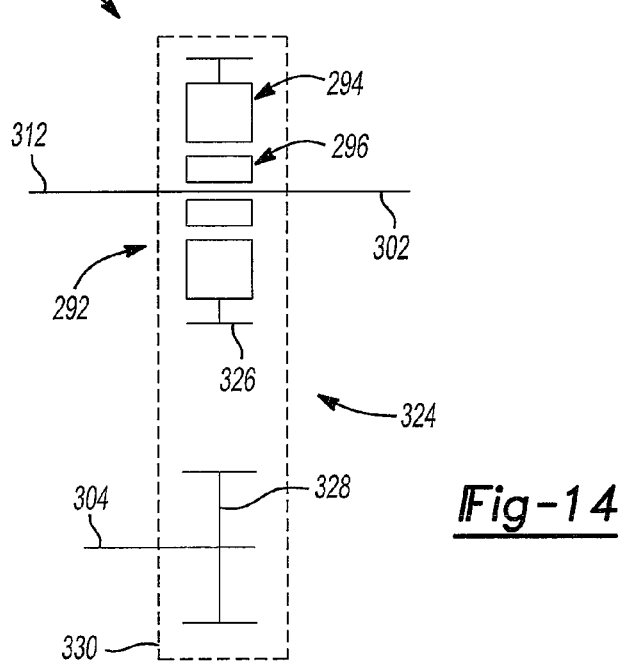

As noted transfer case 290 includes multi-cone clutch 294 and roller clutch actuator 296. With roller clutch in its open mode, interaxle differential 310 permits interaxle speed differentiation between rear output shaft 302 and front output shaft 304. However, operation of roller clutch 296 in its locked mode acts to lock interaxle differential 310 and prevent relative rotation between the front and rear output shafts. FIG. 14 is merely a modified version of transfer case 290 which is constructed without center differential 310 to provide a four-wheel drive system.

A number of preferred embodiments have been disclosed to provide those skilled in the art an understanding of the best mode currently contemplated for the operation and construction of the present disclosure. The disclosure being thus described, it will be obvious that various modifications can be made without departing from the true spirit and scope of the disclosure, and all such modifications as would be considered by those skilled in the art are intended to be included within the scope of the following claims.

What is claimed is:

1. A torque transfer mechanism for transferring drive torque from a rotary input member to a rotary output member, comprising:
a roller clutch including a first set of cam surfaces adapted to be fixed for rotation with the rotary input member, a radially expandable slipper having a second set of cam surfaces and a plurality of rollers positioned between opposing pairs of the cam surfaces;
a friction clutch including a first member being fixed for rotation with the slipper and having multiple conically-shaped surfaces, and a second member adapted to be fixed for rotation with the rotary output member and having multiple conically-shaped surfaces selectively engageable with the conically-shaped surfaces of the first member; and
a wedge slide being radially outwardly moveable by radial expansion of the slipper, the wedge slide including a tapered surface for driving the first member into engagement with the second member and transferring torque between the rotary input and rotary output members.

2. The torque transfer mechanism of claim 1 wherein the roller clutch and the friction clutch are positioned in series between the rotary input and output members.

3. The torque transfer mechanism of claim 1 wherein the first and second sets of cam surfaces extend along angles ranging from ten to fifteen degrees.

4. The torque transfer mechanism of claim 1 wherein the friction clutch includes a third member having multiple conically-shaped surfaces selectively engageable with additional conically-shaped surfaces formed on the second member.

5. The torque transfer mechanism of claim 4 further including another wedge slide being radially outwardly moveable by radial expansion of the slipper, the another wedge slide including a tapered surface for driving the third member into engagement with the second member and transferring torque between the rotary input and output members.

6. The torque transfer mechanism of claim 5 wherein during radial expansion of the slipper, the wedge slide and the another wedge slide are moved radially outward to drive the first and third members toward one another.

7. The torque transfer mechanism of claim 6 further including retention rings coupled to the slipper to restrict axial movement of the wedge slide and the another wedge slide.

8. The torque transfer mechanism of claim 1 wherein the wedge slide and the slipper are each shaped as split rings.

9. The torque transfer mechanism of claim 1 wherein energy to actuate the friction clutch is provided from one of the rotary input and rotary output member.

10. The torque transfer mechanism of claim 1 wherein two of the conical friction surfaces positioned on one of the first member and the second member face one another to form a V-shaped groove.

11. A torque transfer mechanism for transferring drive torque from a rotary input member to a rotary output member, comprising:
a friction clutch including a center ring having conically shaped friction surfaces and first and second outer rings positioned on opposite sides of the center ring, the first outer ring and the second outer ring each including a plurality of conically shaped and radially spaced apart friction surfaces being selectively engageable with the friction surfaces of the center ring; and
a clutch actuator including a roller clutch having a first set of cam surfaces adapted to be fixed for rotation with the rotary input member, a radially expandable slipper having a second set of cam surfaces, a plurality of rollers positioned between opposing pairs of the cam surfaces, a first wedge slide and a second wedge slide, each of the wedge slides being radially outwardly moveable by radial expansion of the slipper, each wedge slide including a tapered surface for driving one of the first and second outer rings into engagement with the center ring to transfer torque between the rotary input and rotary output members.

12. The torque transfer mechanism of claim 11 wherein during radial expansion of the slipper, the first wedge slide and the second wedge slide are moved radially outward to drive the first and second outer rings toward one another.

13. The torque transfer mechanism of claim 12 further including retention rings coupled to the slipper to restrict axial movement of the first wedge slide and the second wedge slide.

14. The torque transfer mechanism of claim 11 wherein the roller clutch and the friction clutch are positioned in series between the rotary input and output members.

15. The torque transfer mechanism of claim 11 wherein the center ring is fixed for rotation with one of the slipper and the rotary output member, the first and second outer rings being fixed for rotation with the other of the slipper and the rotary output member.

16. The torque transfer mechanism of claim 11 wherein the conically shaped friction surfaces include a longitudinal axis aligned with an axis of rotation of the input member.

17. The torque transfer mechanism of claim 11 wherein two of the conical friction surfaces positioned on one of the center ring and the first outer ring face one another to form a V-shaped groove.

18. The torque transfer mechanism of claim 17 wherein two of the conical friction surfaces positioned on the other of the center ring and the first outer ring are positioned adjacent one another to form an axially extending protrusion shaped to compliment the groove.

19. The torque transfer mechanism of claim 18 wherein other conical friction surfaces of the plurality of conical friction surfaces are positioned to define additional V-shaped grooves having different diameters.

20. The torque transfer mechanism of claim 11 wherein energy to actuate the friction clutch is provided from one of the rotary input and rotary output members.

* * * * *